United States Patent Office 3,087,821
Patented Apr. 30, 1963

3,087,821
DIHYDROCHALCONE DERIVATIVES AND THEIR USE AS SWEETENING AGENTS
Robert M. Horowitz, Pasadena, and Bruno Gentili, Glendale, Calif., assignors to the United States of America as represented by the Secretary of Agriculture
No Drawing. Filed Nov. 28, 1961, Ser. No. 155,508
10 Claims. (Cl. 99—141)
Granted under Title 35, U.S. Code (1952), sec. 266

A non-exclusive, irrevocable, royalty-free license in the invention herein described, throughout the world for all purposes of the United States Government, with the power to grant sublicenses for such purposes, is hereby granted to the Government of the United States of America.

This invention relates in general to the art of imparting sweetness to materials, especially food products. More particularly, the invention is concerned with the use of certain dihydrochalcones for such purposes. The objects of the invention include the provision of novel methods and compositions of matter wherein these dihydrochalcones are involved. Additional objects of the invention will be obvious from the following description wherein parts and percentages are by weight unless otherwise specified.

The dihydrochalcones of the invention have the following structure:

(I)
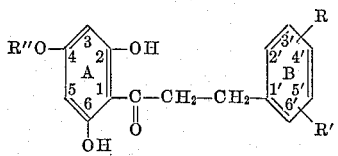

wherein R represents a hydroxyl radical, R' represents a radical selected from the category consisting of hydrogen, hydroxyl, and methoxyl, and R" represents a glycoside residue selected from the category consisting of the glucosyl radical and the neohesperidosyl radical. (The letters A and B are included in the above formula for identification of the respective benzene rings; the numbers within the benzene rings are included to identify the various positions.)

The neohesperidosyl radical may also be termed the 2-O-α-L-rhamnosyl-β-D-glucosyl radical and has the structure:

(II)
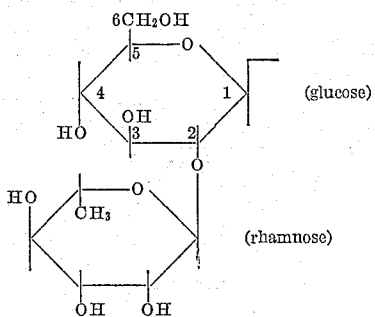

We have found that the compounds of the invention exhibit a distinguishing characteristic in that they are intensely sweet. This is a surprising discovery since there is nothing in the prior art to suggest that these compounds would exhibit such a property. The unusual nature of the compounds of the invention is demonstrated by the fact that sweetness is not a general characteristic of dihydrochalcones as a class. Indeed, many dihydrochalcones which differ from the compounds of the invention by the nature of the substituents on the basic dihydrochalcone nucleus are tasteless or even bitter. Included in this category are such compounds as hesperidin dihydrochalcone, phloridzin, and poncirin dihydrochalcone. (The structure of these compounds is elucidated below.)

Because of their extraordinary sweetness, the dihydrochalcones of the invention are useful as sweetening agents for foods and other products of all kinds. It is further to be noted that the sweetness of these dihydrochalcones is of such an intense degree—comparable to or higher than that of saccharin, which is some 300 to 500 times sweeter than sucrose—that it cannot possibly be attributed to the mere presence of a sugar residue attached to the aglycone moiety.

It has been found, moreover, that for this sweetness to subsist, various elements in the structure of the compounds are critical. These critical factors are explained as follows:

One item is the nature of the glycosyl radical on ring A. Only wherein this radical is glucosyl or neohesperidosyl do the compounds exhibit any useful degree of sweetness and of these compounds those with the neohesperidose residue exhibit maximum sweetness. On the other hand, other corresponding compounds containing the residues of other sugars are tasteless or bitter. An example in this area is hesperidin dihydrochalcone, which is essentially tasteless. This compound corresponds to FORMULA I, above, wherein R is hydroxyl at the 3' position, wherein R' is methoxyl at the 4' position, but wherein R" is the rutinosyl radical.

Another critical item relates to the position of the glycosyl radical on ring A. This radical must occupy the position shown in FORMULA I to attain sweetness. In this connection it is of interest to note that phloridzin, which contains the glycosyl radical at a different position on ring A, is bitter. The structure of phloridzin is:

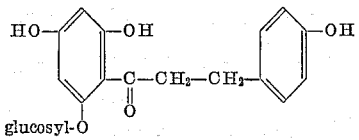

A further critical item is that to provide sweetness, the compounds must contain a hydroxyl group on the B ring. Moreover, the level of sweetness is intensified by the presence on this ring of both (1) a hydroxyl group and (2) a methoxyl group or another hydroxyl group. The importance of hydroxyl on the B ring is illustrated by the fact that poncirin dihydrochalcone is bitter. This compound corresponds to FORMULA I above wherein R" is the neohesperidosyl radical, wherein R' is a methoxyl radical at position 4', but wherein R is hydrogen.

The compounds of the invention can be prepared from the corresponding flavanone glycosides by known methods. In essence, the process involves two steps—(1) conversion of the flavanone glycoside to the corresponding chalcone and (2) reduction of this intermediate to the dihydrochalcone. In the first step the flavanone glycoside is contacted with a relatively concentrated aqueous solution of an alkali, for example a 20–25% aqueous solution of sodium or potassium hydroxide at room temperature. This results in opening the heterocyclic ring between the 1 and 2 positions, producing the chalcone form of the flavanone glycoside. This intermediate is recovered from the reaction system in conventional manner, that is by acidifying the system to precipitate the chalcone. In the next stemp the aim is to hydrogenate the ethylenic double bond of the chalcone to produce the dihydrochalcone. This is readily accomplished by contacting the intermediate with hydrogen gas in the presence of a hydrogenation catalyst, typically finely-divided platinum, palladium, or Raney nickel. The dihydrochalcone being soluble in water and stable therein, can be purified by recrystallization from water solutions in conventional manner. By applying this synthesis to the flavanone glycoside having the proper substituents, any of the dihydrochalcones of the invention may be prepared. The reactions involved in the synthesis are as follows:

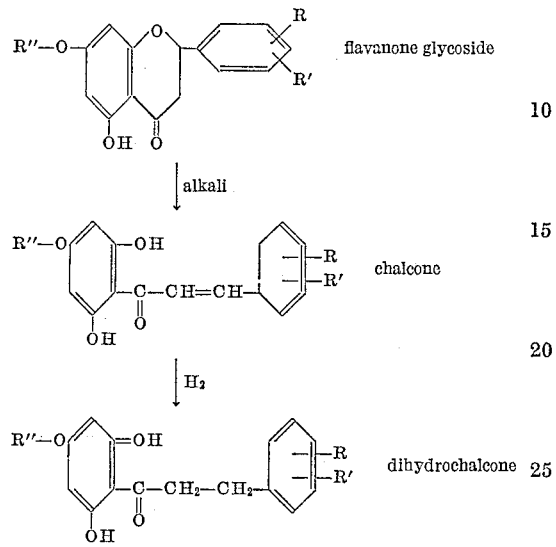

In these formulas R, R', and R" have the significance described above.

Typical examples of dihydrochalcones within the scope of the invention are listed below by way of illustration but not limitation. The structure of these compounds is as shown in Formula I above wherein R, R' and R" have the stated values:

Naringin dihydrochalcone—R is hydroxyl at the 4' position, R' is hydrogen, R" is the neohesperidosyl radical.

Neohesperidin dihydrochalcone—R is hydroxyl at the 3' position, R' is methoxyl at the 4' position, R" is the neohesperidosyl radical.

Prunin dihydrochalcone—R is hydroxyl at the 4' position, R' is hydrogen, R" is the glucosyl radical.

Eriodictyol 7 - neohesperidoside dihydrochalcone—R and R' are each hydroxyl at the 3' and 4' positions, R" is the neohesperidosyl radical.

Homoeriodictyol 7 - neohesperidoside dihydrochalcone—R is hydroxyl at the 4' position, R' is methoxyl at the 3' position R" is the neohesperidosyl radical.

As mentioned hereinabove, all the dihydrochalcones of the invention are extremely sweet. However, there is substantial variation in sweetness among the individual compounds, depending on such factors as the nature of the glycosyl radical on ring A and the nature and the number of substituents on ring B. Of the compounds we have tested, neohesperidin dihydrochalcone is outstanding in its level of sweetness, being on a molar basis 15 to 20 times sweeter than saccharin.

It is also to be noted that the compound neohesperidin dihydrochalcone is new per se, not having been heretofore prepared or described. The structure of this compound is shown in Example 2, below.

The invention is further demonstrated by the following illustrative examples.

It should be noted that the melting points of the dihydrochalcone glycosides reported here are somewhat variable, depending on the age and degree of hydration of the sample, and whether the determination is carried out on a melting point block or in a capillary tube. The melting points reported here were determined on a melting point block using dried samples.

EXAMPLE 1

*Naringin Dihydrochalcone*

A. Two grams of naringin were dissolved in 40 ml. of a 25% aqueous solution of potassium hydroxide at room temperature, allowed to stand several hours, then cooled to 0° C., acidified with cold concentrated hydrochloric acid and let stand at 0° C. for several hours. The bright yellow gelatinous precipitated chalcone was filtered off, washed with cold water, pressed as dry as possible on the funnel and then dried thoroughly at room temperature in a dessicator under vacuum. The product was finally obtained in crystalline form from boiling water, M.P. 201–2° C.

B. The chalcone of naringin, orange-yellow in color, was dissolved in 80 ml. of ethanol and hydrogenated at room temperature and at atmospheric pressure, using palladium-carbon (10%) as catalyst. The resultant colorless solution was evaporated to dryness at 60° C. under vacuum and the residue crystallized twice from water solution. White needle crystals of the dihydrochalcone of naringin were obtained, of M.P. 168–9° C. in a yield of 95%.

The product has the structure—

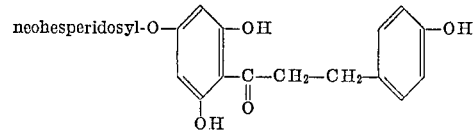

EXAMPLE 2

*Neohesperidin Dihydrochalcone*

Two grams of neohesperidin were treated as described above in Example 1, part A, yielding a red-colored, dry product—the chalcone of neohesperidin. This intermediate was hydrogenated as described in Example 1, part B, and the product was recrystallized twice from water solution. White crystals of the dihydrochalcone of neohesperidin were obtained, M.P. 152–154° C. in a yield of 90%.

The product has the structure—

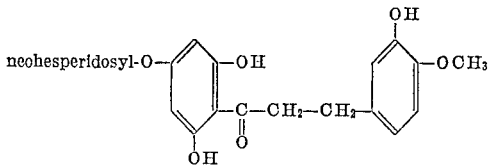

EXAMPLE 3

*Prunin Dihydrochalcone*

Two grams of prunin were treated as described in Example 1, part A, yielding a yellowish-red, dry product—the chalcone of prunin. This intermediate was hydrogenated as described in Example 1, part B and the product recrystallized twice from water solution. Tan-white crystals of prunin dihydrochalcone were obtained, M.P. 135–137° C. in a yield of 89%.

The product has the structure—

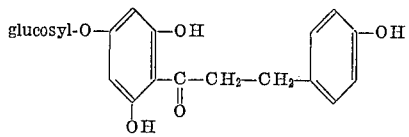

EXAMPLE 4

Dilute aqueous solutions of various concentrations of the products of Examples 1 to 3 were prepared. These solutions were tasted by a taste panel in conjunction with a $2 \times 10^{-4}$ molar solution of saccharin, as a control. The purpose of this test was to measure the sweetness of the compounds by determining the concentration of each solution required to provide a sweetness effect equal to that of the saccharin solution. From the resulting data, the sweetness of the compounds (in relation to saccharin) was determined by applying the formula—

$$\text{Sweetness} = \frac{2 \times 10^{-4}}{\text{Molar concentration of solution of dihydrochalcone having equal sweetness to saccharin solution}}$$

The results are tabulated below:

| Compound | Molar concentration providing equal sweetness | Sweetness |
|---|---|---|
| Saccharin (control) | $2 \times 10^{-4}$ | 1 |
| Neohesperidin dihydrochalcone | $1 \times 10^{-5}$ | 20 |
| Naringin dihydrochalcone | $2 \times 10^{-4}$ | 1 |
| Prunin dihydrochalcone | $5 \times 10^{-4}$ | 0.4 |

It is obvious from the above table that neohesperidin dihydrochalcone is by far the sweetest of the dihydrochalcones tested. Moreover, although the prunin derivative is less than saccharin it still is intensely sweet.

As noted above, the dihydrochalcones of the invention are very sweet. Moreover, they are soluble in water and stable, even in aqueous solution. As a result, they are useful for sweetening all types of materials which are intended for consumption or at least for contact with the mouth of the user, such materials being herein generically designated as edible materials. Typical illustrative examples of edible materials which may be sweetened with the compounds of the invention are fruits; vegetables; juices or other liquid preparations made from fruits or vegetables; meat products, particularly those conventionally treated with sweetened liquors, i.e., bacon and ham; mlk products such as chocolate dairy drinks; egg products such as nogs, custards, angel food mixes; salad dressings; pickles and relishes; ice creams, sherbets, and ices; ice milk products; bakery products; icings; confections and confection toppings, syrups, and flavors; cake and pastry mixes; beverages such as carbonated soft drinks, fruit ades; wines; dietary-type foods; cough syrups and other medicinal preparations intended for oral administration; dental preparations such as pastes, powders, foams and denture-retaining adhesives; mouth washes and similar oral antiseptic liquids; tobacco products; adhesives for gumming stamps, envelopes and labels, etc. In using the compounds of the invention, they are incorporated in the material to be sweetened in the amount required to attain the desired level of sweetness. Ordinarily, because of their intense sweetness, the compounds are employed in a very minor proportion, that is, in a concentration of 1% or less, usually less than 0.5%. It is obvious, however, that there is nothing critical about the concentration of dihydrochalcone which is used; it is simply a matter of attaining a desired sweetness level appropriate to the material in question. Moreover, the technique of sweetening materials with the compounds of the invention offers no difficulty as the selected dihydrochalcone is simply incorporated with the material to be sweetened. The di-hydrochalcones may be added directly to the material or they may be first incorporated with a diluent to increase their bulk so that small amounts of the compounds may be metered into the material. As diluents one may use liquid or solid carriers such as water, glycerol, starch, sorbitol, salt, sugar, citric acid or other non-toxic substance compatible with the material to be sweetened.

Having thus described the invention, what is claimed is:

1. A method for sweetening a food, which comprises adding thereto a compound of the formula—

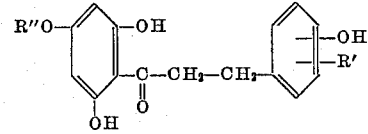

wherein R' represents a radical selected from the group consisting of hydrogen, hydroxyl, and methoxyl, and R" represents a radical selected from the group consisting of glucosyl and neohesperidosyl.

2. The method of claim 1 wherein the compound is naringin dihydrochalcone.

3. The method of claim 1 wherein the compound is neohesperidin dihydrochalcone.

4. The method of claim 1 wherein the compound is prunin dihydrochalcone.

5. A composition comprising (1) a food and, as a sweetener, (2) a compound of the formula:

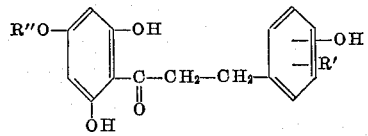

wherein R' represents a radical selected from the group consisting of hydrogen, hydroxyl, and methoxyl, and R" represents a radical selected from the group consisting of glucosyl and neohesperidosyl.

6. The composition of claim 5 wherein the compound is naringin dihydrochalcone.

7. The composition of claim 5 wherein the compound is neohesperidin dihydrochalcone.

8. The composition of claim 5 wherein the compound is prunin dihydrochalcone.

9. Neohesperidin dihydrochalcone having the formula—

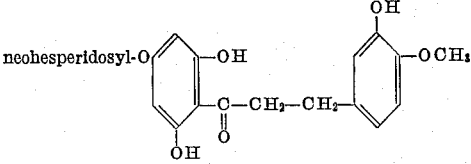

10. A sweetening composition comprising (1) neohesperidin dihydrochalcone and (2) a non-toxic carrier therefor.

No references cited.